United States Patent
Kumar et al.

(10) Patent No.: US 8,988,994 B2
(45) Date of Patent: Mar. 24, 2015

(54) SYSTEM AND METHOD FOR CREATING LOGICAL RADIO LINK CONTROL (RLC) AND MEDIUM ACCESS CONTROL (MAC) PROTOCOL DATA UNITS (PDUS) IN MOBILE COMMUNICATION SYSTEM

(71) Applicants: Anoop Kumar, Delhi (IN); Amit Purohit, Noida (IN)

(72) Inventors: Anoop Kumar, Delhi (IN); Amit Purohit, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 121 days.

(21) Appl. No.: 13/895,385

(22) Filed: May 16, 2013

(65) Prior Publication Data

US 2014/0341013 A1   Nov. 20, 2014

(51) Int. Cl.
 *H04L 1/00*   (2006.01)
 *H04W 28/06*   (2009.01)
 *H04L 12/863*   (2013.01)

(52) U.S. Cl.
 CPC ............. *H04W 28/065* (2013.01); *H04L 47/50* (2013.01)
 USPC ........................................................ 370/229

(58) Field of Classification Search
 CPC ......... H04L 47/10; H04L 47/11; H04L 47/12; H04L 47/30; H04L 47/50; H04W 28/065
 USPC .......................................... 370/229, 310, 328
 See application file for complete search history.

(56) References Cited

U.S. PATENT DOCUMENTS

| | | | |
|---|---|---|---|
| 7,684,439 B2 | 3/2010 | Han et al. | |
| 7,792,130 B2 * | 9/2010 | Fischer | 370/412 |
| 7,796,648 B2 | 9/2010 | Joo et al. | |
| 7,929,410 B2 | 4/2011 | Hepler et al. | |
| 7,978,640 B2 | 7/2011 | Lee et al. | |
| 8,588,175 B2 * | 11/2013 | Kim et al. | 370/331 |
| 2008/0195781 A1 | 8/2008 | Kim et al. | |
| 2008/0205314 A1 | 8/2008 | Pecen | |
| 2009/0116490 A1 | 5/2009 | Charpentier et al. | |
| 2009/0238124 A1 | 9/2009 | Pragada et al. | |
| 2010/0232356 A1 | 9/2010 | Maheshwari et al. | |
| 2010/0325393 A1 | 12/2010 | Lerzer et al. | |
| 2011/0041128 A1 | 2/2011 | Kohlenz et al. | |

OTHER PUBLICATIONS

Anna Larmo et al., The LTE Link-Layer Design, IEEE Communications Magazine, Apr. 2009.

(Continued)

*Primary Examiner* — Chi H Pham
*Assistant Examiner* — Robert Lopata
(74) *Attorney, Agent, or Firm* — Charles Bergere

(57) ABSTRACT

A system for creating logical RLC and MAC PDUs in a mobile communication system includes first and second remote network entities that communicate using the LTE link-layer protocol. The first and second remote network entities include first and second layer-2 protocol stacks, respectively. The first layer-2 protocol stack includes first PDCP, RLC and MAC sub-layers and the second layer-2 protocol stack includes second PDCP, RLC and MAC sub-layers. During transmission of data from the first remote network entity to the second remote network entity, the logical RLC and MAC PDUs are created by the first RLC and MAC sub-layers by populating logical RLC and MAC PDU structures.

10 Claims, 9 Drawing Sheets

(56) References Cited

OTHER PUBLICATIONS

Karl Andre Skevik et al., Evaluation of a Zero-Copy Protocol Implementation, Euromicro Conference, 2001, Sep. 4-6, 2001.

Xiao Chen, An Improved Method of Zero-copy Data Transmission in the High Speed Network Environment, International Conference on Multimedia Information Networking and Security, 2009; Nov. 18-20, 2009.

Yu Chen Li and Mei-Ling Chiang, LyraNET: A Zero-Copy TCP IP Protocol Stack for Embedded Operating System, Embedded and Real-Time Computing Systems and Applications, 2005, Proceedings 11th IEEE International Conference, Aug. 17-19, 2005.

Jianhong Zheng, The research and design of the data path in the LTE system, 2nd International Conference on Information Science and Engineering (ICISE), 2010, IEEE Conference Publications, Dec. 4-6, 2010.

* cited by examiner

| | 402 |
|---|---|
| 1 | MAC Control Element Header buffer pointer — 404a |
| 2 | MAC Control Element Header Size — 404b |
| 3 | MAC SDU Header buffer pointer — 404c |
| 4 | MAC SDU Header Size — 404d |
| 5 | Array of MAC Control Element pointers — 404e |
| 6 | Count of Control Elements — 404f |
| 7 | Array of MAC SDU pointers — 404g |
| 8 | Count of MAC SDU — 404h |

FIG. 4

| | 302 |
|---|---|
| 1 | Pointer to RLC PDU Header buffer — 304a |
| 2 | List of pointers to PDCP PDU buffers — 304b |
| 3 | Count of RLC SDUs in the RLC PDU — 304c |
| 4 | Retransmission Flag — 304d |
| 5 | First SDU offset — 304e |
| 6 | First SDU length — 304f |
| 7 | Terminal SDU offset — 304g |
| 8 | Terminal SDU length — 304h |

FIG. 3

SYSTEM AND METHOD FOR CREATING LOGICAL RADIO LINK CONTROL (RLC) AND MEDIUM ACCESS CONTROL (MAC) PROTOCOL DATA UNITS (PDUS) IN MOBILE COMMUNICATION SYSTEM

BACKGROUND OF THE INVENTION

The present invention relates generally to mobile network communication systems, and more particularly to a system and method for creating logical radio link control (RLC) and medium access control (MAC) protocol data units (PDUs) for the long term evolution (LTE) layer-2 protocol stack.

The third generation partnership project (3GPP) has introduced the LTE system as an effective solution to the increasing performance requirements of mobile broadband communications. The LTE radio interface and radio network architecture ensures a high data transfer rate, reduced latency, data packet optimization, and improved system capacity and coverage. The LTE system offers an evolved universal terrestrial radio access network (E-UTRAN) as an air interface. The E-UTRAN includes several evolved Node-Bs (eNBs), also referred to as base stations (BS) or access points, that are distributed across multiple cells typically having one eNB per cell. Each eNB communicates with multiple user equipments (UEs) located within the coverage area. The uplink and downlink communication between the eNBs and the UEs is enabled by a user plane protocol stack that can be divided into first and second layers L-1 and L-2, respectively.

The first layer L-1 is the physical layer used for transmitting user information over the air interface. The first layer L-1 is connected to the second layer L-2 through a set of transport channels and receives the user information for transmission from the transport channels. The second layer L-2 includes media access control (MAC), radio access control (RLC), and packet data convergence protocol (PDCP) sub-layers that transform user data into a form fit for physical transmission. User data received by the PDCP sub-layer is converted into several PDCP PDUs that are stored in a PDCP transmission buffer. The PDCP PDUs are transmitted to the RLC sub-layer. The RLC sub-layer receives the PDCP PDUs from the PDCP sub-layer and processes the PDCP PDUs to generate RLC PDUs, which are stored in a RLC transmission buffer. The processing of the PDCP PDUs entails segmentation of the PDCP PDUs and then concatenation of the segmented PDCP PDUs to form RLC PDUs of uniform size and in addition to a RLC header for each of the RLC PDUs. The RLC sub-layer transmits the RLC PDUs to the MAC sub-layer, which in turn processes the RLC PDUs to generate MAC PDUs. The MAC PDUs are stored in a MAC transmission buffer from which they are transmitted to the physical layer.

The transmission of the user data for processing through the various sub-layers of the second layer L-2 of the user plane protocol stack requires that the user data be in the form of PDUs to be copied from the transmission buffer of the first sub-layer to the transmission buffer of the second sub-layer. For example, during the transmission of the PDCP PDUs from the PDCP sub-layer to the RLC sub-layer, the PDCP PDUs are copied from the PDCP transmission buffer to the RLC transmission buffer.

Such repeated data movement at each sub-layer requires several central processing unit (CPU) cycles for completion. This CPU effort is duplicated and increases as the size of the PDUs increases at each subsequent layer. Since the CPU is involved in the data movement, the cumulative maximum achievable throughput by the LTE L-2 protocol stack across all UEs on a target platform is effected, considerably reducing the efficiency of the LTE system. If the LTE system supports limited size contiguous buffer allocation and the limited size is less than the maximum RLC PDU or MAC PDU size supported by the LTE L-2 standard, then the system limitation also translates into a feature limitation of the LTE L-2 protocol stack in which all the features offered by the LTE L-2 standard are not exploited.

Therefore, it would be advantageous to have a system and method for creating PDUs at each sub-layer of the LTE L-2 protocol stack that eliminates the repeated movement of data at the RLC and MAC sub-layers, removes any limitation on the size of the PDUs created, and that overcomes the above-mentioned limitations of conventional systems for creating PDUs.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 3 is a schematic block diagram of a logical RLC PDU structure in accordance with an embodiment of the present invention;

FIG. 4 is a schematic block diagram of a logical MAC PDU structure in accordance with an embodiment of the present invention;

DETAILED DESCRIPTION OF THE INVENTION

Figure 1:
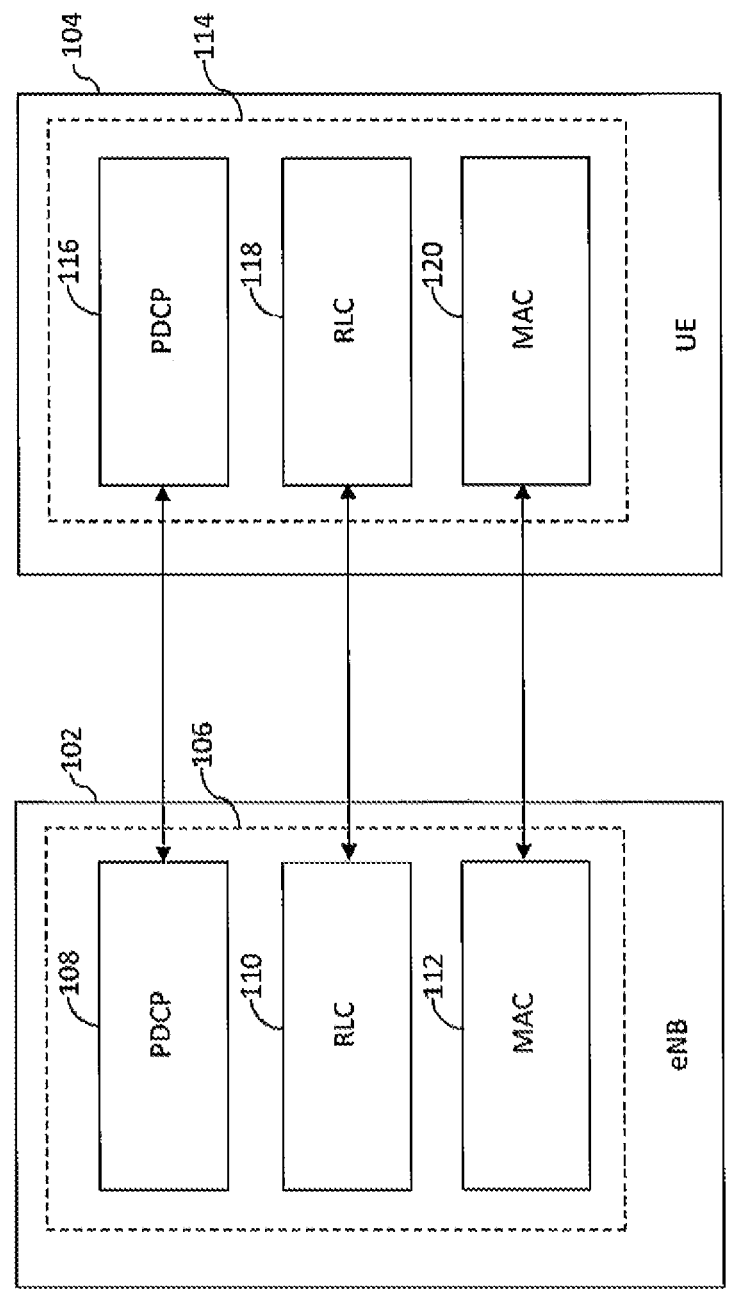
FIG. 1 is a schematic block diagram of eNB and UE LTE layer-2 protocol stacks in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a method of RLC and MAC PDU creation in an LTE Layer2 protocol stack that does not require copying the SDUs to PDUs in order to form them. The elimination of data copy leads to improved performance of the RLC and MAC sub-layers when creating the PDUs. The method does not require shared memory between LTE Layer2 and LTE Layer1.

In an embodiment of the present invention, a method for creating one or more logical radio link control (RLC), protocol data units (PDUs) structures corresponding to one or more RLC PDUs for a RLC sub-layer of a first remote network entity for transmission to a medium access control (MAC) sub-layer of the first remote network entity is provided. A RLC PDU includes a first plurality of packet data convergence protocol (PDCP) PDUs and the first remote network entity is associated with a cellular network. The method includes de-queuing at least one PDCP PDU from a PDCP PDU queue that includes a second plurality of PDCP PDUs and comparing a length of the de-queued PDCP PDU with a remaining length allocated for transmitting the RLC PDU to a second remote network entity by the MAC sub-layer. The second remote network entity is associated with the cellular network. A first buffer is allocated for a header corresponding to the RLC PDU and the header corresponding to the RLC PDU is created in the first buffer. A first memory address of the first buffer is stored in a first field of a logical RLC PDU structure corresponding to the RLC PDU. A first plurality of memory addresses of a first plurality of buffers is stored in a second field of the logical RLC PDU structure. The first plurality of buffers are used to store the first plurality of PDCP PDUs associated with the RLC PDU. A count of the first plurality of PDCP PDUs is determined and stored in a third field of the logical RLC PDU structure.

A retransmission indication flag is stored in a fourth field of the logical RLC PDU structure. The value of the flag is based on a retransmission status of the RLC PDU. Either zero or a first memory address offset corresponding to a second buffer that stores a first PDCP PDU of the first plurality of PDCP PDUs is stored in a fifth field of the logical RLC PDU structure, where the stored value is based on an operating mode of the RLC sub-layer. Either zero or a length of the first PDCP PDU is stored in a sixth field of the logical RLC PDU structure, where the stored value is based on the operating mode of the RLC sub-layer. Further, a third memory address offset corresponding to a third buffer is stored in a seventh field of the logical RLC PDU, where the third buffer stores a first terminal PDCP PDU. A length of the first terminal PDCP PDU is stored in an eighth field of the logical RLC PDU structure. The logical RLC PDU structure is transmitted to the MAC sub-layer.

In another embodiment of the present invention, a method for creating one or more logical MAC PDUs structures corresponding to one or more MAC PDUs for a MAC sub-layer of a first remote network entity for transmission to a MAC sub-layer of a second remote network entity. A first MAC PDU includes a first plurality of RLC PDUs and the first and second remote network entities are associated with a mobile cellular network. The method includes storing a first memory address of a first buffer that stores a MAC control element (CE) header. The first memory address is stored in a first field of a first logical MAC PDU structure of the one or more logical MAC PDU structures and the first logical MAC PDU structure corresponds to a first MAC PDU. A size of the MAC CE header is stored in a second field of the first logical MAC PDU structure.

A second memory address of a second buffer that stores a MAC service data unit (SDU) sub-header is stored in a third field of the first logical MAC PDU structure. A size of the MAC SDU sub-header is stored in a fourth field of the first logical MAC PDU structure. A first plurality of memory addresses of a first plurality of buffers that store a plurality of MAC CEs is stored in a fifth field of the first logical MAC PDU structure. A count of the MAC CEs is stored in a sixth field of the first logical MAC PDU structure. A second plurality of memory addresses of a second plurality of buffers that store the first plurality of RLC PDUs is stored in a seventh field of the first logical MAC PDU structure. A count of the first plurality of RLC PDUs is stored in an eighth field of the first logical MAC PDU structure.

In yet another embodiment of the present invention, a mobile cellular network is provided. The mobile cellular network includes a first remote network entity. The first remote network entity includes a PDCP sub-layer associated with a LTE layer-2 protocol stack. The first remote network entity further includes a RLC sub-layer associated with the LTE layer-2 protocol stack and connected to the PDCP sub-layer. The RLC sub-layer creates one or more logical RLC PDUs corresponding to one or more RLC PDUs using one or more memory addresses of one or more PDCP PDUs.

The first remote network entity further includes a MAC sub-layer associated with the LTE layer-2 protocol stack and connected to the RLC sub-layer. The MAC sub-layer receives the one or more logical RLC PDUs and creates one or more logical MAC PDUs corresponding to one or more MAC PDUs using one or more memory addresses of one or more RLC PDUs. The MAC sub-layer receives the one or more RLC PDUs from the RLC sub-layer in the form of the one or more logical RLC PDUs. The first remote network entity further includes a plurality of buffers, connected to the PDCP, RLC, and MAC sub-layers, for storing the one or more PDCP PDUs and one or more headers corresponding to the one or more RLC PDUs and the one or more MAC PDUs. The one or more PDCP PDUs continue to remain stored when the one or more logical RLC PDUs and the one or more logical MAC PDUs are created. The mobile cellular network further includes a second remote network entity for receiving the one or more logical MAC PDUs transmitted by the MAC sub-layer of the first remote network entity.

Various embodiments of the present invention provide a system and method for creating logical RLC and MAC PDUs corresponding to RLC and MAC PDUs that are transmitted from a first remote network entity to a second remote network entity. The first and second remote network entities communicate based on the LTE link-layer protocol. The first and second remote network entities include first and second layer-2 protocol stacks, respectively. The first layer-2 protocol stack includes first PDCP, RLC, and MAC sub-layers and the second layer-2 protocol stack includes second PDCP, RLC and MAC sub-layers. During transmission of data from the first remote network entity to the second remote network entity, the logical RLC and MAC PDUs are created by the first RLC and MAC sub-layers by populating logical RLC and MAC PDU structures. The logical RLC and MAC PDU structures include memory addresses of buffers that store data corresponding to the RLC and MAC PDUs, and other attributes, viz., length of RLC header and MAC CE header, counts of PDCP PDUs, RLC PDUs, MAC CEs, and retransmission indication flags for the RLC PDUs.

The RLC and MAC PDUs are transmitted across the first RLC and MAC sub-layers for appending transmission specific information before being transmitted to the second remote network entity. The logical RLC and MAC PDUs are created and transmitted across the first RLC and MAC sub-layers, instead of transmitting the RLC and MAC PDUs. Transmission of the RLC and MAC PDUs entails deleting data from a buffer associated with a source sub-layer, viz., the first RLC sub-layer 110 and copying the data into a buffer associated with the a destination sub-layer, viz., the first MAC sub-layer 112, which translates into a huge resource cost for a central processing unit (CPU). However in the present invention, the RLC and MAC PDUs are transmitted as logical RLC and MAC PDUs and the need for moving data across the source and destination buffers is eliminated, which leads to considerable resource savings for the CPU. These resource savings increase with the size of RLC and MAC PDUs being created. The resource savings of the CPU further translate into an increase in a cumulative maximum achievable throughput by the first and second layer-2 protocol stacks across all users on a target platform.

Due to the storage of RLC and MAC PDUs in distributed buffers, a limit imposed on a maximum size of the RLC and MAC PDUs that can be generated by the RLC or the MAC sub-layers depending upon the maximum size of contiguous buffer allocation supported by a system is also eliminated. The elimination of the limit on the maximum size of the RLC and MAC PDUs enables smooth functioning of the features offered by the LTE L-2 standard.

Referring now to FIG. 1, a schematic block diagram of an evolved node B (eNB) 102 and a user equipment (UE) 104 that communicate based on long term evolution (LTE) link-layer protocol in accordance with an embodiment of the present invention, is shown. The eNB 102 and the UE 104 may each include standard electronic components including a receiver, a transmitter, a processor, a memory, and a network card and that the presence of the aforementioned elements will be obvious to those skilled in the art and hence are not depicted in FIG. 1. The eNB 102 includes a first layer-2 protocol stack 106. The first layer-2 protocol stack 106 includes a first packet data convergence protocol (PDCP) sub-layer 108, a first radio link control (RLC) sub-layer 110, and a first medium access control (MAC) sub-layer 112. The UE 104 includes a second layer-2 protocol stack 114. The second layer-2 protocol stack 114 includes a second PDCP sub-layer 116, a second RLC sub-layer 118, and a second MAC sub-layer 120.

The LTE link-layer protocol includes the first and second layer-2 protocol stacks 106 and 114 that reside in the eNB 102 and the UE 104, respectively. In an embodiment of the present invention, the eNB 102 is a base station (BS) or an access point. During a downlink communication, user data is transmitted from the eNB 102 as data packets by way of an air interface to the UE 104 and during an uplink communication, user data is transmitted from the UE 104 to the eNB 102 by way of the air interface. The UE 104 is a mobile device, examples of which may include a USB dongle, smart phone, tablet personal computer (PC), and the like. Before being transmitted through the air interface, the user data traverses various sub-layers in the form of protocol data units (PDUs) generated by each sub-layer. User data is provided to the first PDCP sub-layer 108 from a higher layer (not shown) as service data units (SDUs). The first PDCP sub-layer 108 transforms the SDUs into PDCP PDUs by performing a first predetermined set of operations. In an embodiment of the present invention, the first predetermined set of operations may include operations of compression of higher layer headers contained within PDCP SDUs, ciphering and sequence number addition to the PDCP SDUs.

After adding the above mentioned information to the SDUs, the SDUs are transformed into PDCP PDUs (or RLC SDUs) and stored in a transmission buffer. Memory addresses corresponding to the transmission buffer that stores the PDCP PDUs (RLC SDUs) are transmitted to the first RLC sub-layer 110. The first RLC sub-layer 110 performs a second predetermined set of operations on a first plurality of PDCP PDUs, to generate a plurality of RLC PDUs. In an embodiment of the present invention, the second predetermined set of operations may include concatenation and segmentation of PDCP PDUs, RLC sub-layer header creation, acknowledgement transmission to a peer RLC sub-layer entity, acknowledgement processing from the peer RLC sub-layer entity, and retransmission of RLC PDUs or RLC PDU segments. The first RLC sub-layer 110 creates a logical RLC PDU corresponding to each RLC PDU. The logical RLC PDU is created by populating fields of a logical RLC PDU structure that correspond to one or more attributes of a second plurality of PDCP PDUs that are associated with a RLC PDU and thus associated with a corresponding logical RLC PDU. The steps performed during the populating of the fields of the logical RLC PDU structure will be explained with reference to FIGS. 5A, 5B, and 5C. In an embodiment of the present invention, the fields include memory addresses of the transmission buffer that stores the PDCP PDUs and the RLC header. Additionally, the fields include a count of PDCP PDUs associated with the logical RLC PDU, a retransmission flag indicating whether the logical RLC PDU is being retransmitted to a peer entity, a memory address of the buffer that stores a first RLC SDU, a length of the first RLC SDU, a memory address of the buffer that stores a terminal RLC SDU, and a length of the terminal RLC SDU. The logical RLC PDU structure is stored in the transmission buffer. The logical RLC PDU structure will be explained with reference to FIGS. 2 and 3.

Multiple logical RLC PDU structures are populated and memory addresses of the transmission buffer that stores the logical RLC PDUs are transmitted to the first MAC sub-layer 112. The first MAC sub-layer 112 performs a third predetermined set of operations on the logical RLC PDUs received from the first RLC sub-layer 110 and generates a plurality of MAC PDUs. In an embodiment of the present invention, the third predetermined set of operations includes adding zero or more MAC control elements (CEs), a MAC control element (CE) header, a MAC SDU header, transmission of MAC acknowledgements to a peer MAC sub-layer entity, processing of MAC acknowledgements from the peer MAC sub-layer entity, and retransmission of MAC PDUs to the peer MAC sub-layer entity. Additionally, the first MAC sub-layer 112 also adds a plurality of MAC CEs within each logical MAC PDU. The MAC CEs carry in-band control information during the communication between the eNB 102 and UE 104. The first MAC sub-layer 112 creates a logical MAC PDU corresponding to each MAC PDU. The logical MAC PDU is generated by populating fields of a logical MAC PDU structure that correspond to one or more attributes of the plurality of logical RLC PDUs that are associated with a first MAC PDU and thus associated with a corresponding first logical MAC PDU. Steps performed during populating the fields of the first logical MAC PDU have been explained in detail in conjunction with FIG. 7. In an embodiment of the present invention, the fields include memory addresses of the transmission buffer that stores the logical RLC PDUs, the MAC CE header, and the MAC SDU header. Additionally, the fields store sizes of the MAC CE and SDU headers, memory addresses of the transmission buffers that store the plurality of CEs, counts of the plurality of CEs and the plurality of logical RLC PDUs associated with the first logical MAC PDU. The logical MAC PDU structure has been explained in detail in conjunction with FIGS. 2 and 4. Multiple logical MAC PDUs are created which are transmitted to the physical layer. The physical layer or the transmission mechanism to physical layer resolves the memory addresses populated in the fields of the logical MAC PDUs. The physical layer then transmits the user data and the information added by the first PDCP, RLC, and MAC sub-layers as data packets to the UE 104.

The transmission of the data packets may be performed in either an unacknowledged mode (UM) or an acknowledged mode (AM) of the first RLC sub-layer 110. When the transmission is performed in the AM, acknowledgment for the receipt of the data packets transmitted by the first RLC sub-layer 110 is provided by a corresponding peer entity, i.e., the second RLC sub-layer 118. When an acknowledgement is not received corresponding to any data packet, the respective PDUs are retransmitted by the corresponding sub-layer, i.e., the first RLC sub-layer 110 and the first MAC sub-layer 112. Steps performed during retransmission of the PDUs have been explained in detail in conjunction with the FIGS. 6A, 6B, and 6C. If the transmission has been performed in the UM then no acknowledgement is sent by a destination RLC entity, i.e., the second RLC sub-layer 118, to a source RLC entity, i.e., the first RLC sub-layer 110 and there is no provision of retransmissions between the source and destination RLC sub-layers 110 and 118.

Figure 2:
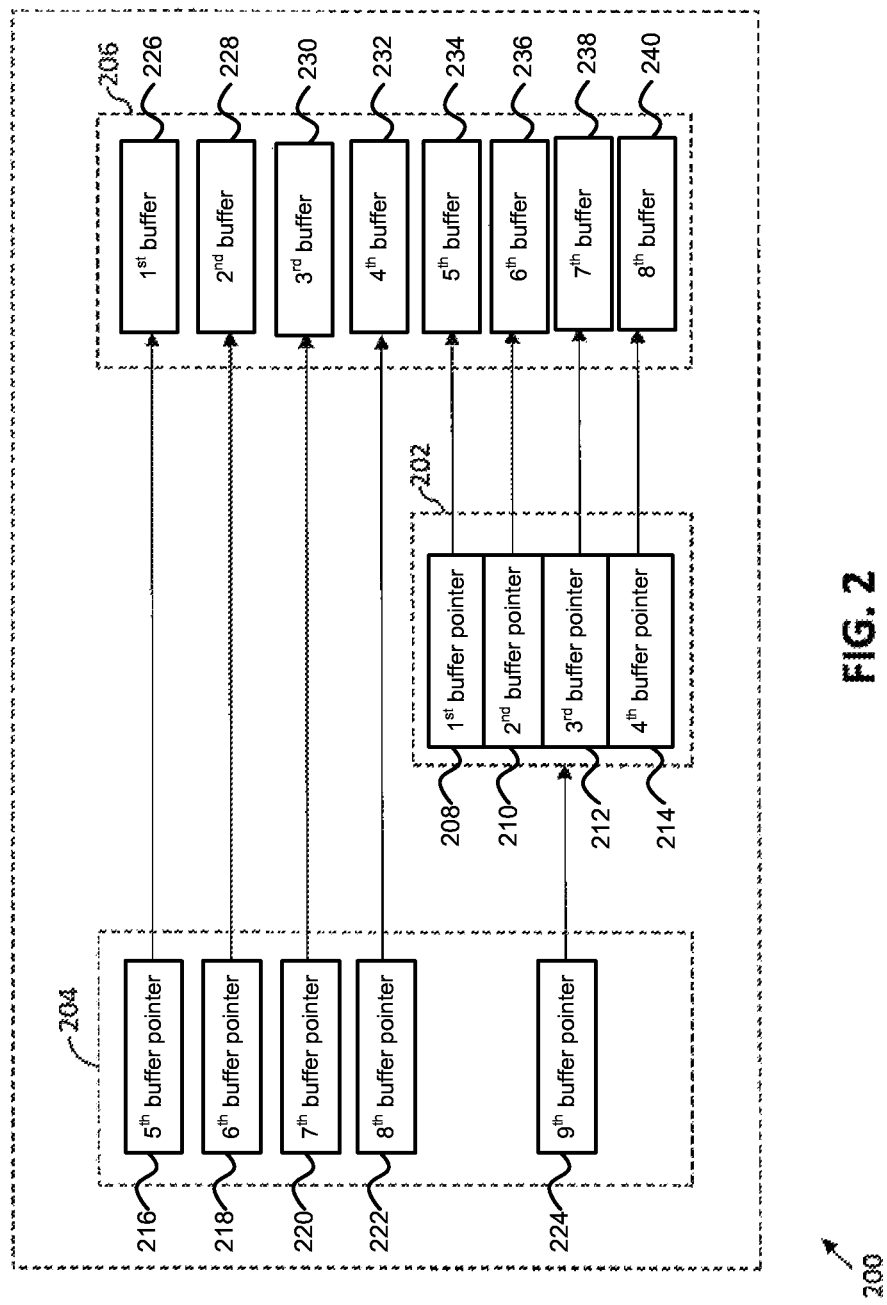
FIG. 2 is a schematic block diagram of a memory module in accordance with an embodiment of the present invention.

Referring now to FIG. 2, a schematic block diagram of a memory module 200 in accordance with an embodiment of the present invention, is shown. In various embodiments of the present invention, the eNB 102 and the UE 104 each include a memory module 200. The memory module 200 includes a logical RLC PDU 202, a logical MAC PDU 204, and a set of buffers 206. The logical RLC PDU 202 includes first through fourth buffer pointers 208-214. The logical MAC PDU 204 includes fifth through ninth buffer pointers 216-224. The set of buffers 206 includes first through eighth buffers 226-240.

The logical RLC PDU 202 is organized in the memory module 200 as a first set of buffer pointers, i.e., the first through fourth buffer pointers 208-214 that point to the fifth through eighth buffers 234-240, respectively. In an embodiment of the present invention, the fifth buffer 234 stores a RLC PDU header corresponding to a RLC PDU associated with the logical RLC PDU 202 and the sixth through eighth buffers 236-240 store first through third PDCP PDUs of a second plurality of PDCP PDUs associated with the RLC PDU that is in turn associated with the logical RLC PDU 202. The memory module 200 includes additional buffers (not shown) for storing remaining PDCP PDUs (apart from the first through third PDCP PDUs). Memory addresses of the fifth through eighth buffers 234-240 are stored in the first through fourth buffer pointers 208-214, respectively. For example, the first buffer pointer 208 stores the memory address of the fifth buffer 234, thus pointing to the fifth buffer 234. As mentioned above the logical RLC PDU 202 is created by populating the fields of a corresponding logical RLC PDU structure, i.e., the first through fourth buffer pointers 208-214 form a subset of the fields of the logical RLC PDU structure. The logical RLC PDU structure has been explained in detail in conjunction with FIG. 3.

The logical MAC PDU 204 is organized in the memory module 200 as a second set of buffer pointers, i.e., the fifth through eighth buffer pointers 216-222 that point to the first through fourth buffers 226-232, respectively, and the ninth buffer pointer 224 that points to the logical RLC PDU 202. The memory module 200 includes additional buffers (not shown) for pointing to remaining logical RLC PDUs (apart from the logical RLC PDU 202). In an embodiment of the present invention, the first buffer 226 stores a MAC CE header corresponding to a MAC PDU associated with the logical MAC PDU 204, the second buffer 228 stores a MAC SDU header corresponding to the MAC PDU associated with the logical MAC PDU 204, and the third and fourth buffers 230 and 232 store first and second MAC CEs of a plurality of MAC CEs. The memory module 200 includes additional buffers (not shown) for storing remaining MAC CEs (apart from the first and second MAC CEs). As mentioned above the logical MAC PDU 204 is created by populating the fields of a corresponding logical MAC PDU structure, i.e., the fifth through eighth buffer pointers 216-224 form a subset of the fields of the logical MAC PDU structure. The logical MAC PDU structure has been explained in detail in conjunction with FIG. 4.

Referring now to FIG. 3, a schematic block diagram of a logical RLC PDU structure 302 in accordance with an embodiment of the present invention, is shown. The logical RLC PDU structure 302 includes first through eighth fields 304a-304h. FIG. 3 will be explained in conjunction with FIGS. 1 and 2.

The first field 304a is the first buffer pointer 208 that points to the fifth buffer 234. As mentioned above the fifth buffer 234 (refer FIG. 2) stores the RLC PDU header corresponding to a RLC PDU associated with the logical RLC PDU 202. The second field 304b is an array of buffer pointers, viz., the second through fourth buffer pointers 210-214 that point to the sixth through eighth buffers 236-240. The sixth through eighth buffers 236-240 store first through third PDCP PDUs of the second plurality of PDCP PDUs associated with the RLC PDU that is in turn associated with the logical RLC PDU 202. The third field 304c stores a count of the second plurality of PDCP PDUs associated with the RLC PDU. The fourth field 304d stores a retransmission indication flag for indicating a retransmission status of the RLC PDU. In an embodiment of the present invention, the retransmission indication flag is a binary value that is set to logic one when the RLC PDU associated with the logical RLC PDU 202 is retransmitted subsequent to a failed transmission attempt and the binary value is set to logic zero during an initial transmission of the RLC PDU.

The fifth field 304e stores either a zero or a memory address offset corresponding to the sixth buffer 236 based on an operating mode of the first and second RLC sub-layers 110 and 118 (refer FIG. 1). In an embodiment of the present invention, during a downlink communication when the first RLC sub-layer 110 operates in an acknowledged mode, the memory address offset corresponding to the sixth buffer 236 is stored in the fifth field 304e and when the first RLC sub-layer 110 operates in an unacknowledged mode, zero is stored in the fifth field 304e. The sixth field 304f stores either a zero or a length of the first PDCP PDU based on an operating mode of the first and second RLC sub-layers 110 and 118 (refer FIG. 1). In an embodiment of the present invention, during the downlink communication when the first RLC sub-layer 110 operates in the acknowledged mode, the length of the first PDCP PDU is stored in the sixth field 304f and when the first RLC sub-layer 110 operates in the unacknowledged mode, zero is stored in the sixth field 304f. The seventh field 304g stores a memory address offset corresponding to a terminal buffer (not shown) that stores a terminal PDCP PDU of the second plurality of PDCP PDUs and the eighth field 304h stores a length of the terminal PDCP PDU.

Referring now to FIG. 4, a schematic block diagram of a logical MAC PDU structure 402 in accordance with an embodiment of the present invention, is shown. The logical MAC PDU structure 402 includes first through eighth fields 404a-404h. FIG. 4 will be explained in conjunction with FIGS. 1 and 2.

The first field 404a is the fifth buffer pointer 216 that points to the first buffer 226. As mentioned above the first buffer 226 (refer FIG. 2) stores the MAC CE header corresponding to the MAC PDU associated with the logical MAC PDU 204. The second field 404b stores a size of the MAC CE header. The third field 404c is the sixth buffer pointer 218 that points to the second buffer 228. As mentioned above the second buffer 228 stores the MAC SDU header corresponding to the MAC PDU associated with the logical MAC PDU 204. The fourth field 404d stores a size of the MAC CE header. The fifth field 404e is an array of buffer pointers, viz., the seventh and eighth buffer pointers 220 and 222 that point to the third and fourth buffers 230 and 232. The third and fourth buffers 230 and 232 store first and second MAC CEs of the plurality of MAC CEs corresponding to the MAC PDU associated with the logical MAC PDU 204. The sixth field 404*f* stores a count of the plurality of MAC CEs. The seventh field 404*g* is an array of buffer pointers, viz., the ninth buffer pointer 224 that points to a plurality of logical RLC PDUs, viz., the logical RLC PDU 202, associated with the MAC PDU that in turn is associated with the logical MAC PDU 204. The eighth field 404*h* stores a count of the plurality of logical RLC PDUs.

Figure 5A:
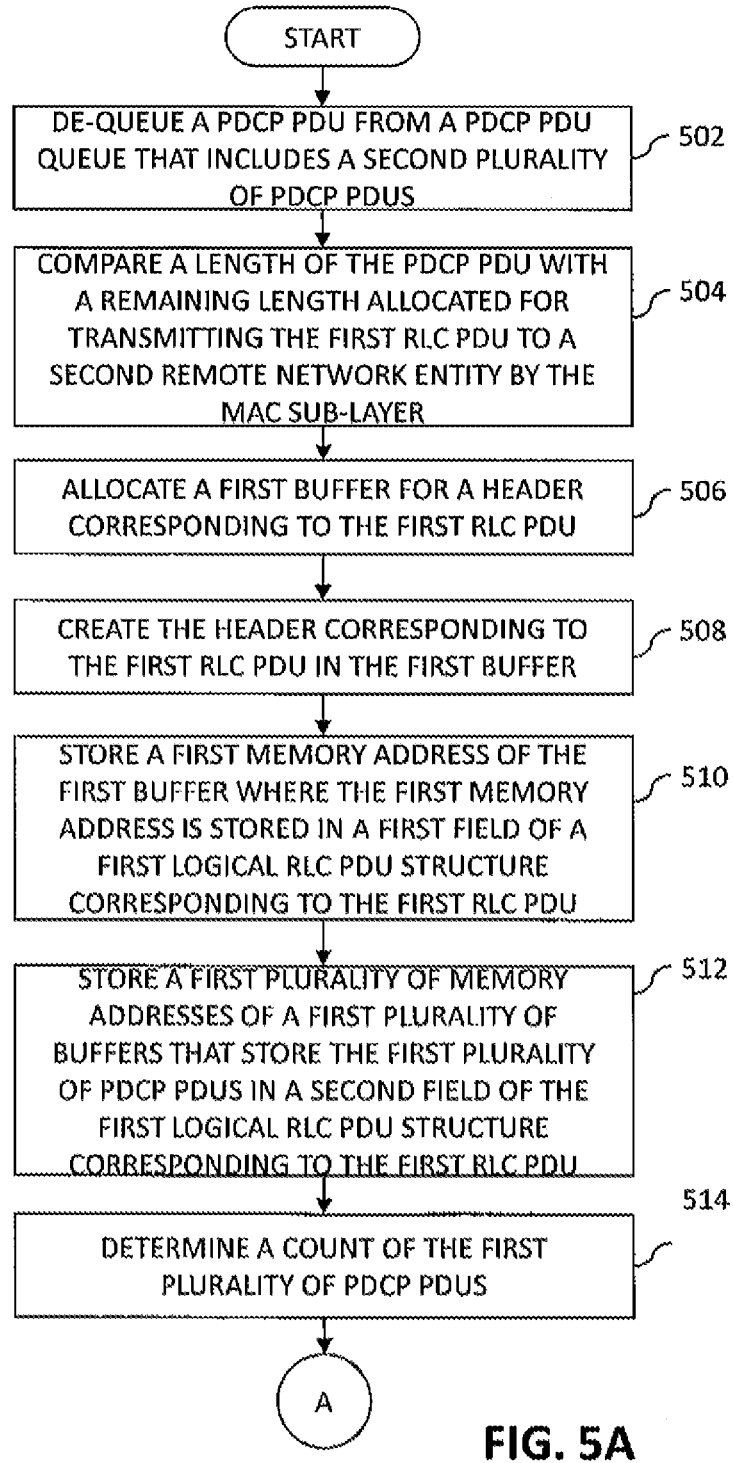
FIGS. 5A, 5B, and 5C are a flow chart of a method for creating one or more logical RLC PDU structures in accordance with an embodiment of the present invention.
Figure 5B:
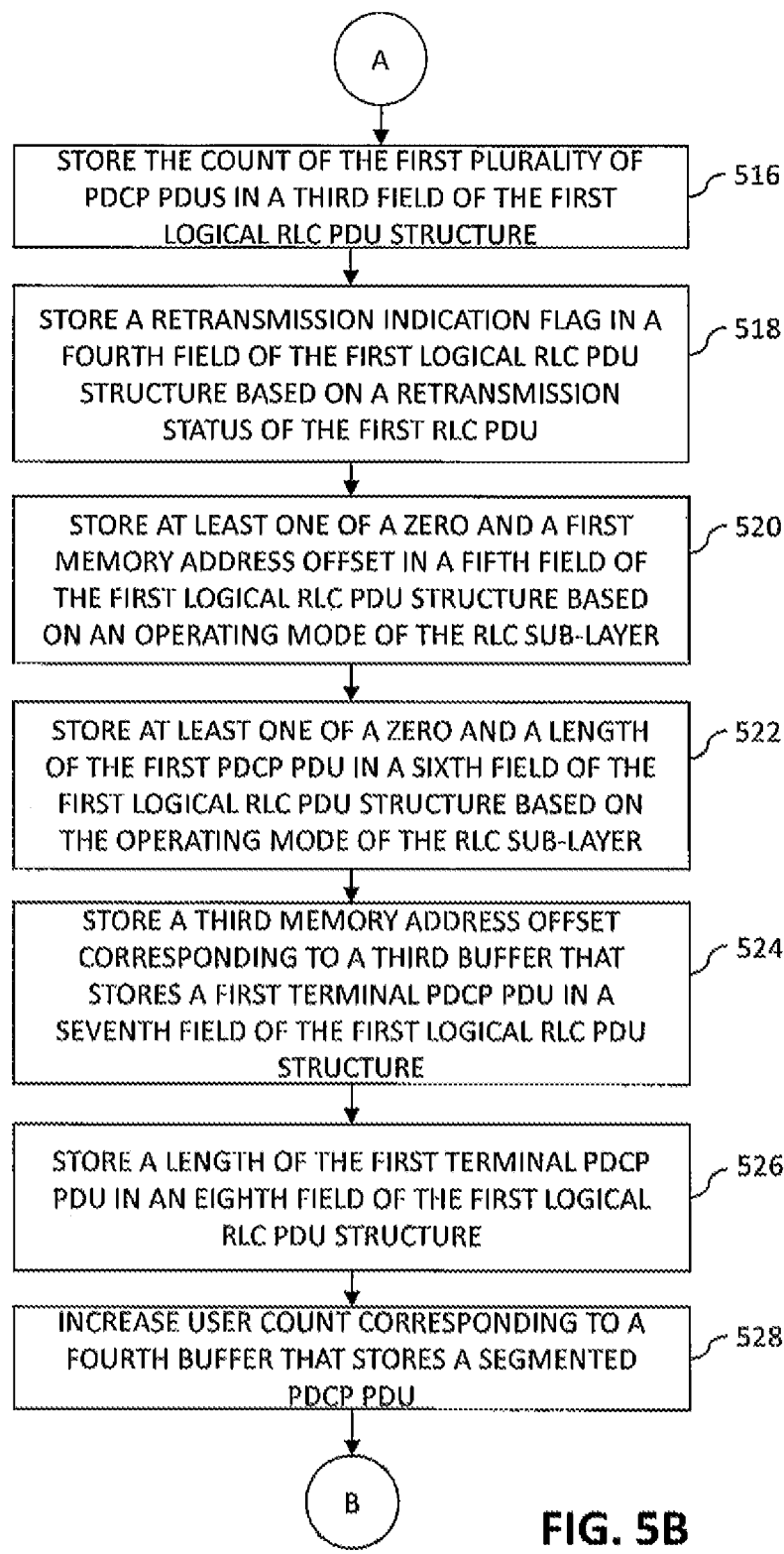
Figure 5C:
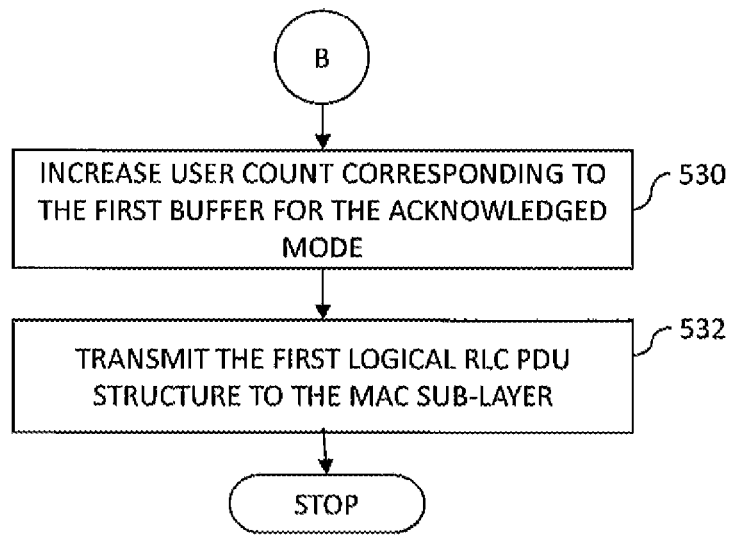

Referring now to FIGS. 5A, 5B, and 5C, a flowchart of a method for creating the logical RLC PDU structures 302 in accordance with an embodiment of the present invention, is shown. FIGS. 5A, 5B, and 5C are explained in detail in conjunction with the FIGS. 1, 2, and 3.

At step 502, a PDCP PDU is de-queued from a PDCP PDU queue (not shown) that includes the first plurality of PDCP PDUs. The PDCP PDU queue stores the first plurality of PDCP PDUs generated in sequence by the first PDCP sub-layer 108 that need to be transmitted to the UE 104. The first RLC sub-layer 110 periodically de-queues PDCP PDUs from the PDCP PDU queue based on allocations received from a MAC scheduler. The PDCP PDU queue stores the first plurality of PDCP as pointers to one or more buffers, viz., sixth through eighth buffers 236-240 store first through third PDCP PDUs that store the first plurality of PDCP PDUs. Each of the PDCP PDU includes user data that has been transformed by the first PDCP sub-layer 108 in a manner explained in conjunction with the FIG. 1 to generate the PDCP PDU. At step 504, a length of the PDCP PDU is compared with a remaining length left of an allocated length for transmitting a RLC PDU associated with the logical RLC PDU 202 from a first remote network entity to a second remote network entity. A cumulative length of the second plurality of PDCP PDUs associated with the RLC PDU is reduced from the allocated length to calculate the remaining length. In an embodiment of the present invention, the first remote network entity is the eNB 102 and the second remote network entity is the UE 104. The RLC PDU is transmitted by the first MAC sub-layer 112 to the second MAC sub-layer 120. The first and second remote network entities are associated with a mobile cellular network that operates based on LTE standard protocols. At step 506, the fifth buffer 234 is allocated for storing the RLC PDU header corresponding to the RLC PDU.

At step 508, the RLC PDU header is created in the fifth buffer 234. At step 510, a memory address of the fifth buffer 234 is stored in the first field 304*a*, thereby causing the first field 304*a* to point to the fifth buffer 234. In an embodiment of the present invention, the first field 304*a* is the first buffer pointer 208 that points to the fifth buffer 234. At step 512, memory addresses of a plurality of buffers, viz., the sixth through eighth buffers 236-240, that store the second plurality of PDCP PDUs, viz., the first through third PDCP PDUs are stored in the second field 304*b*. In an embodiment of the present invention, the second field 304*b* is the array of buffer pointers, viz., the second through fourth buffer pointers 210-214 that point to the sixth through eighth buffers 236-240, respectively. At step 514, a count of the second plurality of PDCP PDUs is determined. At step 516, the count of the second plurality of PDCP PDUs is stored in the third field 304*c*. At step 518, a retransmission indication flag is stored in the fourth field 304*d* for indicating a retransmission status of the RLC PDU. In an embodiment of the present invention, the retransmission indication flag is a binary value that is set to logic zero during an initial transmission attempt of the RLC PDU associated with the logical RLC PDU 202 and is set to logic one when the RLC PDU is retransmitted subsequent to a failure of the initial transmission attempt. At step 520, either a zero or a memory address offset corresponding to the sixth buffer 236 is stored in the fifth field 304*e* based on the operating mode of the first and second RLC sub-layers 110 and 118 as explained in conjunction with FIG. 3. At step 522, either a zero or the length of the first PDCP PDU is stored in the sixth field 304*f* based on the operating mode of the first and second RLC sub-layers 110 and 118 explained in conjunction with FIG. 3. At step 524, the memory address offset corresponding to the terminal buffer (not shown) that stores the terminal PDCP PDU of the second plurality of PDCP PDUs is stored in the seventh field 304*g*. At step 526, the length of the terminal PDCP PDU is stored in the eighth field 304*h*. At step 528, a first user count corresponding to a fourth buffer of the plurality of buffers that stores a segmented PDCP PDU is increased to indicate that the fourth buffer is being used, thus preventing accidental deletion of the contents thereof by the first MAC sub-layer 112. At step 530, a second user count corresponding to the fifth buffer 234 that stores the RLC PDU header is increased when the first RLC sub-layer 110 operates in acknowledged mode. At step 532, the logical RLC PDU structure 302 is transmitted to the first MAC sub-layer 112.

Figure 6C:
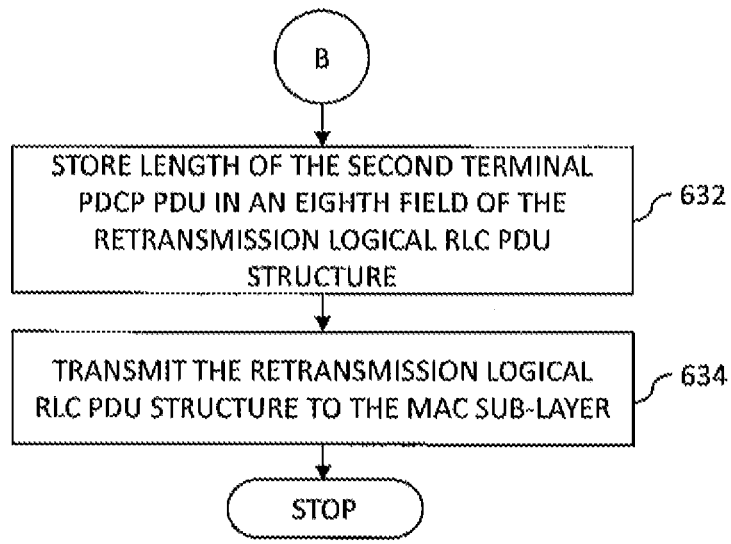
FIGS. 6A, 6B, and 6C are a flow chart of a method for retransmitting a RLC PDU in accordance with an embodiment of the present invention.
Figure 6A:
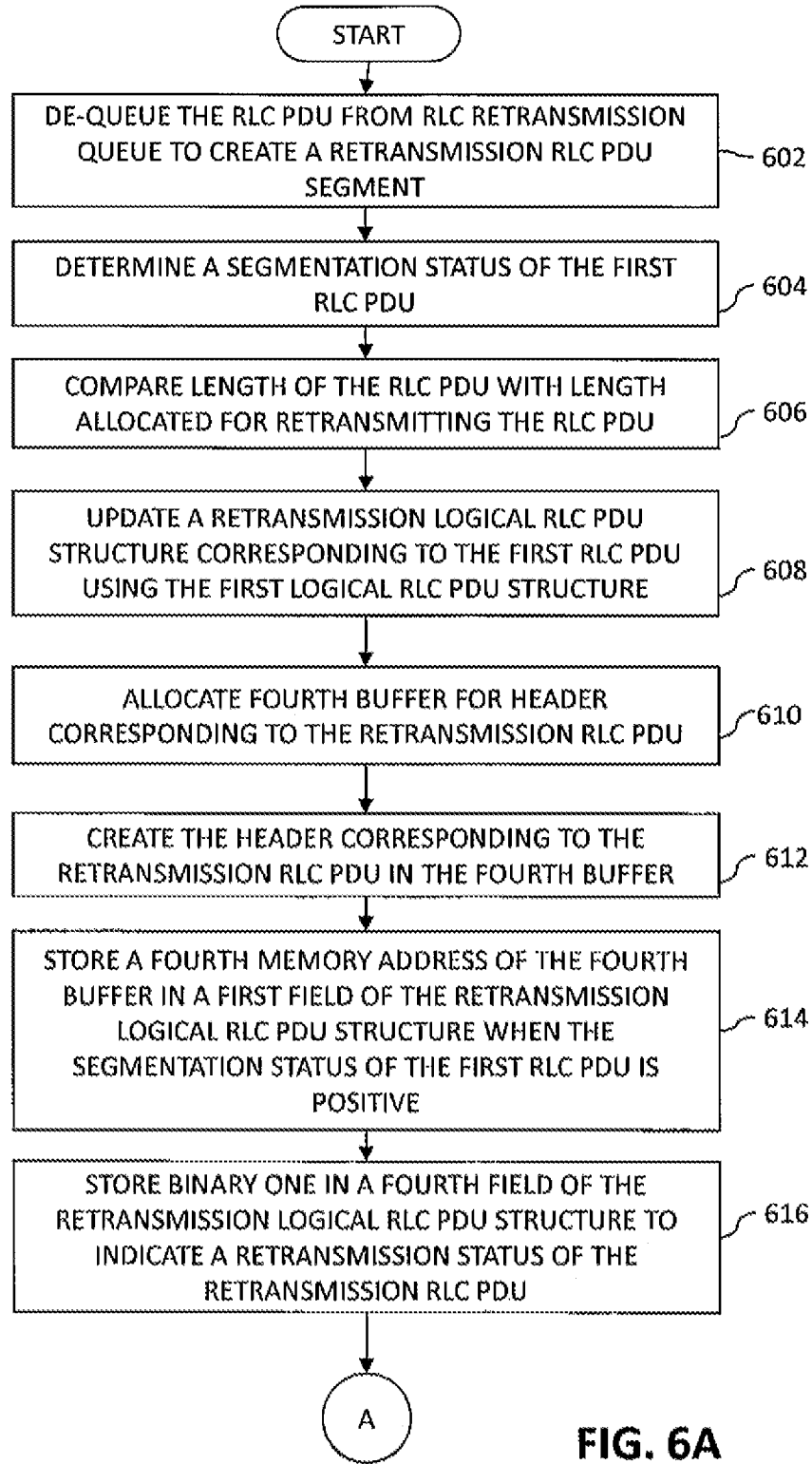
Figure 6B:
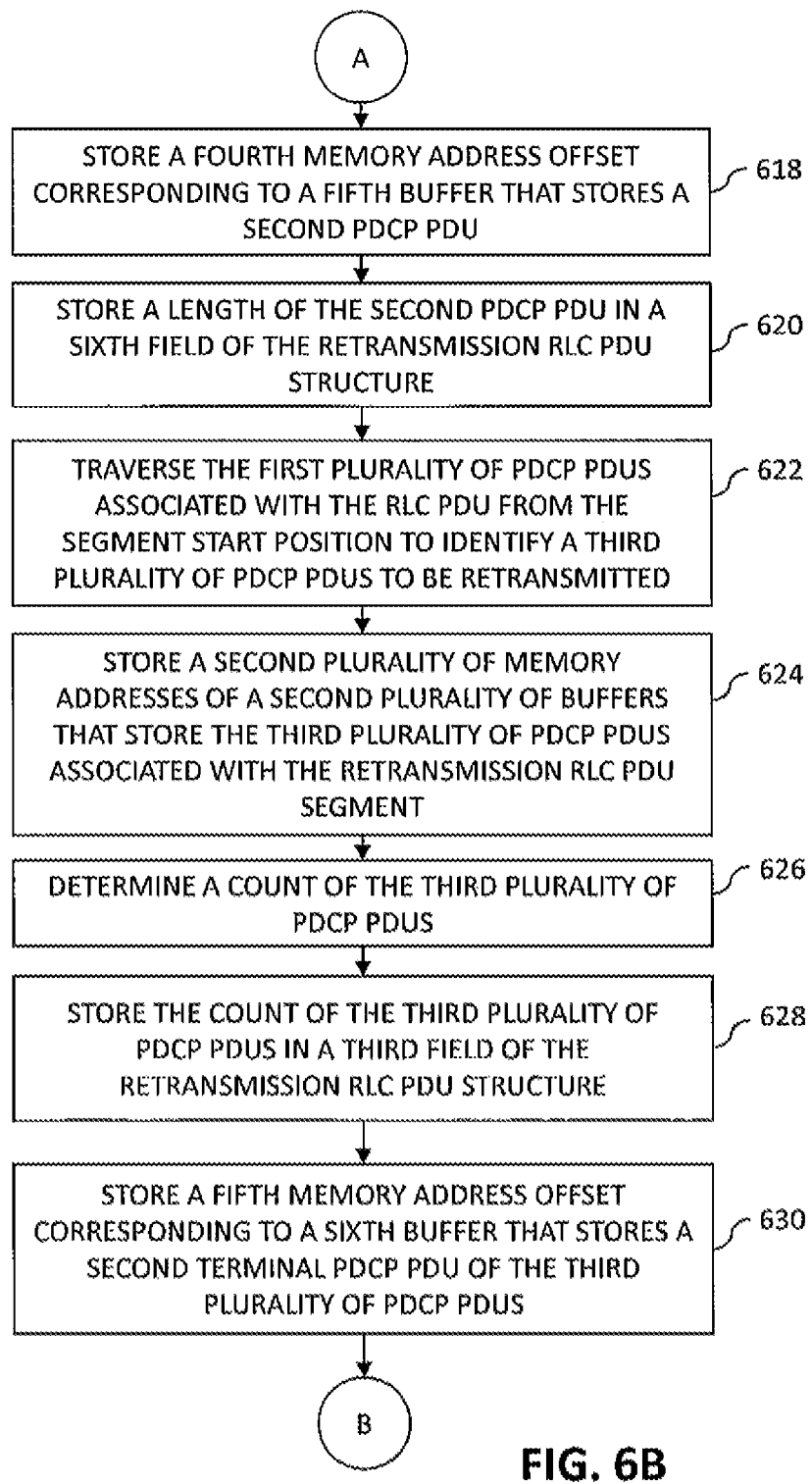

Referring now to FIGS. 6A, 6B, and 6C, a flowchart of a method for retransmitting the RLC PDU associated with the logical RLC PDU 202 in accordance with an embodiment of the present invention, is shown. FIGS. 6A, 6B, and 6C are explained in detail in conjunction with the FIGS. 1, 2, and 3.

At step 602, the RLC PDU (not shown) is de-queued from a RLC retransmission queue (not shown) to create a retransmission RLC PDU or retransmission RLC PDU segment. The RLC retransmission queue includes one or more RLC PDUs transmitted by the first RLC sub-layer 110 but not yet acknowledged by a remote RLC entity, viz., the second sub-layer 118, of their successful reception. Every RLC PDU transmitted by the first RLC sub-layer 110 is included in the RLC retransmission queue and is removed therefrom upon the receipt of an acknowledgment signal of their successful reception by the second RLC sub-layer 118. At step 604, a segmentation status of the RLC PDU is determined. At step 606, a length of the RLC PDU to be retransmitted, i.e., a retransmission RLC PDU length, is compared with a length allocated for retransmitting the RLC PDU. At step 608, a retransmission logical RLC PDU structure corresponding to the retransmission RLC PDU is updated using the logical RLC PDU structure 302 when the length of the retransmission RLC PDU is less than the length allocated for retransmission and the retransmission RLC PDU is not segmented. Subsequently the retransmission logical RLC PDU structure is transmitted to the first MAC sub-layer 112. When the length for the retransmission RLC PDU is greater than the length allocated for retransmission or the retransmission RLC PDU is segmented, then step 610 onwards are executed.

At step 610, a ninth buffer (not shown) is allocated for storing a header corresponding to the retransmission RLC PDU when the length of the retransmission RLC PDU is greater than the length allocated for retransmission or the retransmission RLC PDU is segmented. At step 612, the header corresponding to the retransmission RLC PDU is created in the ninth buffer. At step 614, a memory address corresponding to the ninth buffer is stored in a first field of the retransmission logical RLC PDU structure when the retransmission RLC PDU is segmented. At step 616, binary one is stored in a fourth field of the retransmission logical RLC PDU structure to indicate a retransmission status of the retransmission RLC PDU. At step 618, a memory address offset corresponding to a tenth buffer (not shown) that stores a fourth PDCP PDU that includes a segment start position corresponding to the RLC PDU is stored in a fifth field of the retransmission logical RLC PDU structure. At step 620, a length of the fourth PDCP PDU is stored in a sixth field of the retransmission RLC PDU structure. The length of the fourth PDCP PDU is determined from the segment start position. At step 622, the second plurality of PDCP PDUs associated with the retransmission RLC PDU is traversed beginning from the segment start position. While traversing, a cumulative length of a third plurality of PDCP PDUs already traversed is calculated and compared with the length allocated for transmitting the retransmission RLC PDU segment. The traversal is terminated when either the terminal PDCP PDU included in the second plurality of PDCP PDUs is reached or when the cumulative length of the third plurality of PDCP PDUs becomes equal to the length allocated for transmitting the retransmission RLC PDU.

At step 624, memory addresses corresponding to a second plurality of buffers that store the third plurality of PDCP PDUs are stored in a second field of the retransmission logical RLC PDU structure. At step 626, a count of the third plurality of PDCP PDUs is determined. At step 628, the count of the third plurality of PDCP PDUs is stored in a third field of the retransmission RLC PDU structure. At step 630, memory address offset corresponding to an eleventh buffer that stores a terminal PDCP PDU of the third plurality of PDCP PDUs is stored in a seventh field of the retransmission logical RLC PDU structure. At step 632, a length of the terminal PDCP PDU of the third plurality of PDCP PDUs is stored in an eighth field of the retransmission logical RLC PDU structure. At step 634, the retransmission logical RLC PDU structure is transmitted to the first MAC sub-layer 112.

Figure 7:
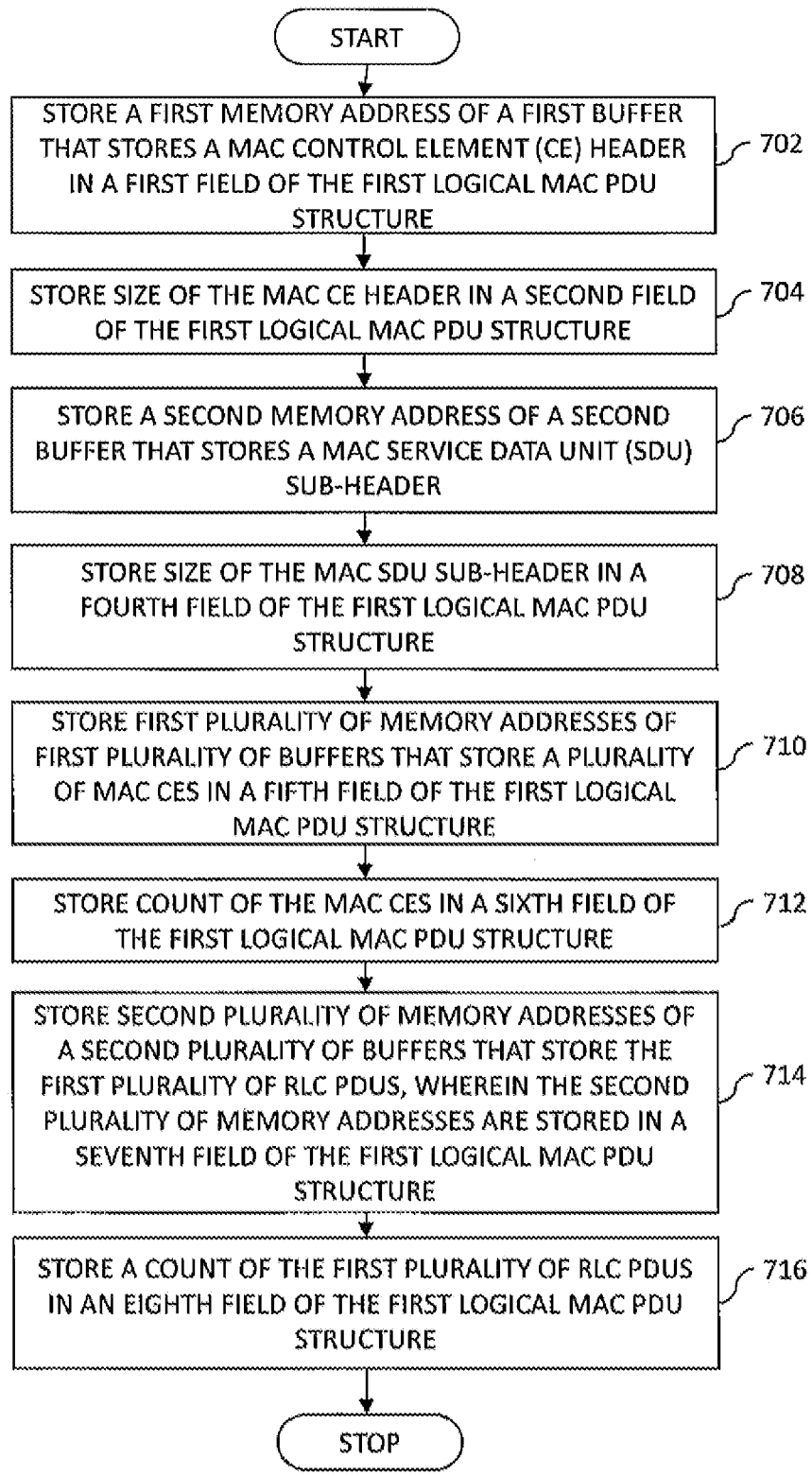
FIG. 7 is a flow chart of a method for creating one or more logical MAC PDU structures in accordance with an embodiment of the present invention.

Referring now to FIG. 7, a flowchart for creating the logical MAC PDU structure 402 in accordance with an embodiment of the present invention, is shown. FIG. 7 is explained in detail in conjunction with the FIGS. 1, 2, and 4.

At step 702, the memory address of the first buffer 226 that stores the MAC CE header is stored in the first field 404*a*. In an embodiment of the present invention, the first field 404*a* is the fifth buffer pointer 216 that points to the first buffer 226. At step 704, a size of the MAC CE header is stored in a second field 404*b*. At step 706, the memory address of the second buffer 228 that stores the MAC SDU sub-header is stored in the third field 404*c*. In an embodiment of the present invention, the third field 404*c* is the sixth buffer pointer 218 that points to the second buffer 228. At step 708, a size of the MAC SDU sub-header is stored in the fourth field 404*d*. At step 710, memory addresses of a third plurality of buffers that store a plurality of MAC CEs are stored in the fifth field 404*e*. In an embodiment of the present invention, the fifth field 404*e* is an array of buffer pointers, viz., the seventh and eighth buffer pointers 220 and 222 that point to the third and fourth buffers 230 and 232. At step 712, a count of the plurality of MAC CEs is stored in the sixth field 404*f*. At step 714, memory addresses of a fourth plurality of buffers that store the plurality of RLC PDUs associated with the MAC PDU that in turn is associated with the logical MAC PDU 204 are stored in the seventh field 404*g*. In an embodiment of the present invention, the seventh field 404*g* is an array of buffer pointers, viz., the ninth buffer pointer 224 that points to a plurality of logical RLC PDUs, viz., the logical RLC PDU 202. At step 716, a count of the plurality of RLC PDUs is stored in the eighth field 404*h* to create the logical MAC PDU structure 402.

Various embodiments of the present invention entail transmitting PDUs, viz., PDCP, RLC, and MAC PDUs across different sub-layers, viz., the first PDCP sub-layer 108, the first RLC sub-layer 110, and the first MAC sub-layer 112 as memory addresses of transmission buffers, viz., the first through eighth buffers 226-240 that store data corresponding PDCP, RLC, and MAC PDUs. Transmission of the PDUs as the memory addresses requires data to be retained in the transmission buffers until an acknowledgment is received from a final destination of a PDU. For example, a memory address to the sixth buffer 236 that stores the second PDCP PDU is used to create the logical RLC PDU 202 that is transmitted to the first MAC sub-layer 112 and a memory address to the logical RLC PDU 202 is used to create the logical MAC PDU 204 that is further used for processing. Thus, contents of the sixth buffer 236 need to be retained until the final processing of a MAC PDU corresponding to the logical MAC PDU 204 is performed. To accomplish retention of the contents of the transmission buffers while data traverses various sub-layers, access and lifetime of the transmission buffers is increased to persist across the various sub-layers.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for creating one or more logical radio link control (RLC) protocol data units (PDUs) structures corresponding to one or more RLC PDUs for a RLC sub-layer of a first remote network entity for transmission to a medium access control (MAC) sub-layer of the first remote network entity, wherein a RLC PDU includes a first plurality of packet data convergence protocol (PDCP) PDUs, and wherein the first remote network entity is associated with a cellular network, the method comprising:
   de-queuing at least one PDCP PDU from a PDCP PDU queue, wherein the PDCP PDU queue includes a second plurality of PDCP PDUs;
   comparing a length of the at least one PDCP PDU with a remaining length of an allocated length for transmitting the RLC PDU to a second remote network entity by the MAC sub-layer, wherein the allocated length is a count of bytes allocated for transmitting the RLC PDU, wherein lengths of the first plurality of PDCP PDUs are reduced from the allocated length to calculate the remaining length, wherein the second remote network entity is associated with the cellular network;
   allocating a first buffer for a header corresponding to the RLC PDU;
   creating the RLC PDU header in the first buffer;
   storing a first memory address of the first buffer in a first field of a logical RLC PDU structure that corresponds to the RLC PDU;
   storing a first plurality of memory addresses of a first plurality of buffers that store the first plurality of PDCP PDUs associated with the RLC PDU, in a second field of the logical RLC PDU structure;
   determining a count of the first plurality of PDCP PDUs;
   storing the count of the first plurality of PDCP PDUs in a third field of the logical RLC PDU structure;
   storing a retransmission indication flag in a fourth field of the logical RLC PDU structure, wherein a value of the flag is based on a retransmission status of the RLC PDU;
   storing one of zero and a first memory address offset corresponding to a second buffer used to store a first PDCP PDU of the first plurality of PDCP PDUs, in a fifth field of the logical RLC PDU structure, wherein the stored value is based on an operating mode of the RLC sub-layer;

storing one of zero and a length of the first PDCP PDU in a sixth field of the logical RLC PDU structure, wherein the stored value is based on the operating mode of the RLC sub-layer;

storing a third memory address offset corresponding to a third buffer that is used for storing a PDCP PDU of a first terminal, in a seventh field of the logical RLC PDU structure;

storing a length of the PDCP PDU of the first terminal in an eighth field of the logical RLC PDU structure; and transmitting the logical RLC PDU structure to the MAC sub-layer.

2. The method of claim 1, wherein the first and second remote network entities include at least one of a base station and a user equipment (UE).

3. The method of claim 1, further comprising increasing a first user count corresponding to a fourth buffer used to store a segmented PDCP PDU, wherein the first user count indicates the number of users using the fourth buffer.

4. The method of claim 1, wherein the operating mode of the RLC sub-layer includes at least one of an un-acknowledged mode and an acknowledged mode.

5. The method of claim 4, further comprising increasing a second user count corresponding to the first buffer for the acknowledged mode.

6. The method of claim 5, further comprising the RLC sub-layer retransmitting the RLC PDU to the second remote network entity when a requirement for retransmission of the RLC PDU is determined by the RLC sub-layer.

7. The method of claim 6, wherein retransmitting the RLC PDU comprises:

de-queuing the RLC PDU from a RLC retransmission queue to create a retransmission RLC PDU segment, wherein the RLC retransmission queue includes a plurality of RLC PDUs to be retransmitted;

determining a segmentation status of the RLC PDU;

comparing a length of the RLC PDU with a length allocated for retransmitting the RLC PDU;

updating a retransmission logical RLC PDU structure corresponding to the RLC PDU using the logical RLC PDU structure when the length of the RLC PDU is one of less than and equal to the length allocated for retransmitting the RLC PDU and the RLC PDU is not segmented;

allocating a fourth buffer for a retransmission RLC PDU header;

creating the retransmission RLC PDU header in the fourth buffer;

storing a fourth memory address of the fourth buffer in a first field of the retransmission logical RLC PDU structure when the RLC PDU is segmented;

storing binary one in a fourth field of the retransmission logical RLC PDU structure to indicate a retransmission status of the retransmission RLC PDU;

storing a fourth memory address offset corresponding to a fifth buffer that stores a second PDCP PDU, wherein the second PDCP PDU includes a segment start position corresponding to the RLC PDU, and wherein the fourth memory address offset is stored in a fifth field of the retransmission logical RLC PDU structure;

storing a length of the second PDCP PDU in a sixth field of the retransmission RLC PDU structure, wherein the length of the second PDCP PDU is determined from the segment start position;

traversing the first plurality of PDCP PDUs associated with the RLC PDU from the segment start position to identify a third plurality of PDCP PDUs to be retransmitted based on the length allocated for transmitting the retransmission RLC PDU segment;

storing a second plurality of memory addresses of a second plurality of buffers that store the third plurality of PDCP PDUs associated with the retransmission RLC PDU segment, wherein the second plurality of memory addresses is stored in a second field of the retransmission logical RLC PDU structure;

determining a count of the third plurality of PDCP PDUs;

storing the count of the third plurality of PDCP PDUs in a third field of the retransmission RLC PDU structure;

storing a fifth memory address offset corresponding to a sixth buffer that stores a second terminal PDCP PDU of the third plurality of PDCP PDUS, wherein the fifth memory address offset is stored in a seventh field of the retransmission logical RLC PDU structure;

storing a length of the second terminal PDCP PDU in an eighth field of the retransmission logical RLC PDU structure; and retransmitting the retransmission logical RLC PDU structure to the MAC sub-layer.

8. The method of claim 1, wherein creating the RLC PDU header in the first buffer includes populating the first buffer with information in accordance with the third Generation Partnership Project (3GPP) standard for RLC.

9. A wireless network for cellular communications, comprising:

a first remote network entity, comprising:
a packet data convergence protocol (PDCP) sub-layer associated with a long term evolution (LTE) Layer-2 protocol stack;
a radio link control (RLC) sub-layer associated with the LTE Layer-2 protocol stack and connected to the PDCP sub-layer, wherein the RLC sub-layer creates one or more logical RLC protocol data units (PDUs) corresponding to one or more RLC PDUs using one or more memory addresses of one or more PDCP PDUs;
a medium access control (MAC) sub-layer associated with the LTE Layer-2 protocol stack and connected to the RLC sub-layer, wherein the MAC sub-layer receives the one or more logical RLC PDUs and creates one or more logical MAC PDUs corresponding to one or more MAC PDUs using one or more memory addresses of one or more RLC PDUs, wherein the MAC sub-layer receives the one or more RLC PDUs from the RLC sub-layer in the form of the one or more logical RLC PDUs; and
a plurality of buffers, connected to the PDCP, RLC, and MAC sub-layers, for storing the one or more PDCP PDUs and one or more headers corresponding to the one or more RLC PDUs and the one or more MAC PDUs, wherein the one or more PDCP PDUs remain stored in the plurality of buffers when the one or more logical RLC PDUs and the one or more logical MAC PDUs are created; and a second remote network entity for receiving the one or more MAC PDUs transmitted by the MAC sub-layer of the first remote network entity.

10. The system of claim 9, wherein the first and second remote network entities include at least one of a base station and user equipment (UE).

* * * * *